PULSE REPETITION RATE SELECTOR

Filed July 1, 1955

INVENTORS
ETIENNE DE FAYMOREAU
MARK MANDEL
BY Philip M. Bolton
ATTORNEY

United States Patent Office 2,795,775

Patented June 11, 1957

2,795,775

PULSE REPETITION RATE SELECTOR

Etienne de Faymoreau, Nutley, and Mark Mandel, Bloomfield, N. J., assignors to International Telephone and Telegraph Corporation, Nutley, N. J., a corporation of Maryland Application July 1, 1955, Serial No. 519,303

5 Claims. (Cl. 340—171)

This invention relates to a pulse responsive circuit adapted to produce an output solely in response to a series of pulses of a predetermined repetition rate.

In many systems employing pulses, certain signals are characterized by a series of pulses which differ from other pulses in the system solely by their repetition rate. In such systems, it is required to recognize these signals even though extraneous pulses are interleaved with the pulses of these desired signals.

An object of the present invention is a provision of an improved circuit for this purpose. This circuit is characterized by its simplicity and high reliability.

Figure 1:
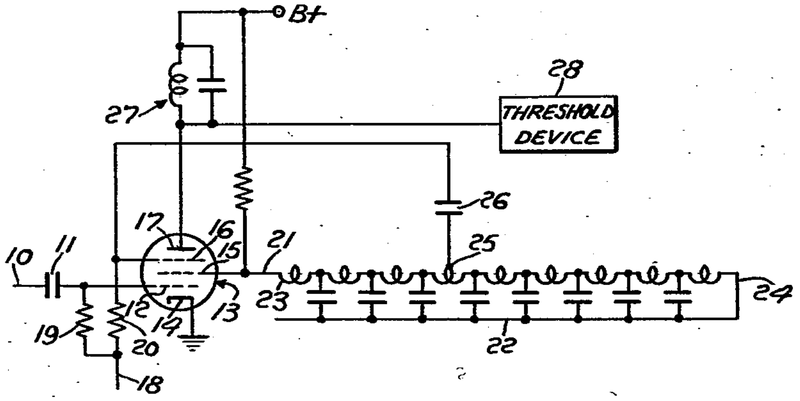
Figure 2:
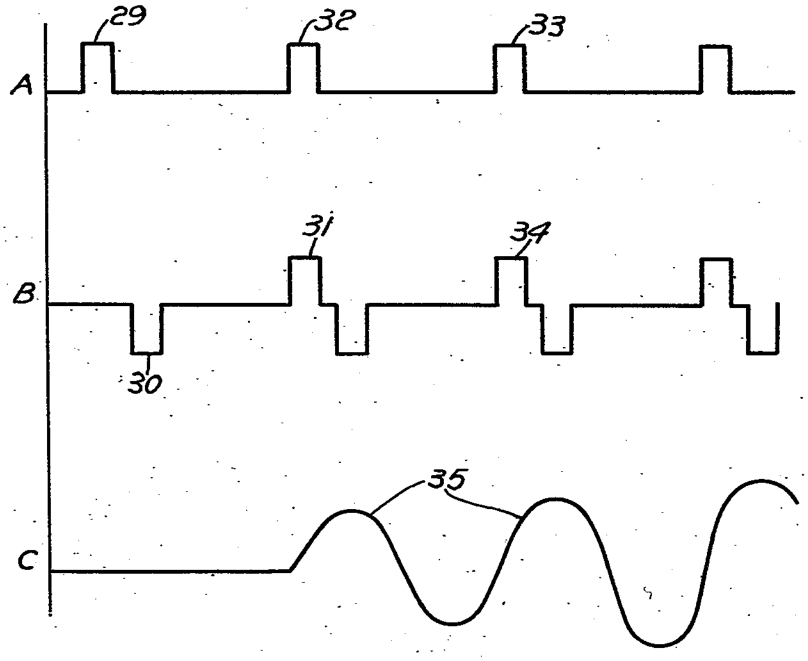

Other and further objects of the present invention will become apparent, and the foregoing will be better understood with reference to the following description of an embodiment thereof, reference being had to the drawings in which:

Fig. 1 is a schematic diagram of a pulse repetition rate selector according to the present invention and Fig. 2 is a set of curves used in describing the foregoing circuit.

In a preferred embodiment for carrying out the present invention the input pulse signal is applied to the first grid counting from the cathode of a pentode tube whose first and third grids are normally biased to cutoff. Each positive input pulse produces a negative pulse on the second grid which negative pulse travels along a shorted reflecting delay line to the end thereof and is reflected and inverted.

At a predetermined point this inverted pulse is taken from a tap on the delay line and applied to the third grid to overcome its bias. The total delay from the input of the delay line to the short and back to the tap is equal to one period of the pulse repetition frequency of the desired signal. Thus the inverted pulse is applied to the third grid at the same time a subsequent desired input pulse is applied to the first grid. This coincidence causes a pulse of current to flow to the anode and shock excites a high Q tuned circuit in series with the anode. The tuned circuit starts to oscillate beginning at a relatively low amplitude. The tuned circuit is tuned to the same frequency as the repetition frequency of the desired pulses so that each subsequent anode pulse produced in the aforedescribed manner is timed so that it increases the amplitude of the oscillations of the tuned circuit until a maximum is reached. The oscillations developed across the tuned circuit are fed to a threshold device which only responds when the amplitude of the oscillations are above a given value and usually close to the maximum. In this manner only a series of pulses having the desired repetition rate will produce an output sufficient to pass the threshold.

Referring now to the specific embodiment of the present invention illustrated in the drawings, an input pulse signal is applied via line 10 and coupling condenser 11 to the first grid 12 of a pentode 13 having a cathode 14, second and third grids 15 and 16 and an anode 17. The first grid 12 and the third grid 16 are both biased to cut off by a biasing voltage from a source of negative bias 18, applied to said grids via decoupling resistors 19 and 20 respectively. Upon a positive pulse being applied to the first grid 12 a negative pulse is produced upon the second grid 15. This pulse is fed along line 21 to a shorted delay line 22 and passes from the input end 23 thereof to the shorted end 24 where it is inverted into a positive pulse and reflected. The reflected positive pulse is picked up at a tap 25 on said delay line and fed therefrom via coupling condenser 26 to the third grid 16. This reflected inverted pulse applied to the third grid 16 overcomes the bias thereof and, if simultaneously therewith a pulse is being applied to the first grid 12, a flow of current occurs to the anode 17 and shock excites a resonant circuit 27 in series therewith. Subsequent pulses of current to the anode 17 resulting from the coincidence of pulses on grids 12 and 16 occur with such timing as to increase the amplitude of the oscillations of resonant circuit 27. The result is that a voltage wave of increasing amplitude is produced across resonant circuit 27 and is fed to a subsequent threshold device 28. The threshold device may be any utilization device having a threshold level below which it does not respond.

The operation of the foregoing circuit will become clearer from the following description with relation to the curves of Fig. 2. Assuming in a given example that the desired signal consists of a train of pulses spaced apart by 30 microseconds, such a train of pulses would appear as shown in curve A of Fig. 2. Taking the initial pulse 29 as applied to grid 12, it would appear as a negative pulse 30 (see curve B) on grid 15. The pulse 30 would then pass along the delay line till the tap point 25. This would impress a negative voltage through coupling condenser 26 on grid 16. Since however, the grid is already cut off by the biasing voltage it would have no effect whatsoever on the operation of said tube. The negative pulse 30 then continues along the delay line to the end 24 where it is reflected and inverted and returned towards tap 25. At tap 25 it would appear as a positive pulse 31 as shown in curve B. This pulse 31 would then appear on grid 16 simultaneously with the appearance of the next pulse 32 (curve A) of the input pulse train. The delay line in the given example may have a total delay of 18 microseconds and the tap is positioned a distance from the shorted or reflecting end 24 at a point to add 12 more microsecond delay. Thus the inverted and reflected pulse would coincide with pulse 32 which is 30 microseconds after pulse 29 and consequently a pulse of current would be fed through the anode to the tuned circuit 27. The tuned circuit 27 is preferably of high Q and is tuned, in the given example, to a frequency of 33.3 kc. Thus, the tuned circuit 27 would make a single oscillation 35 before the next flow of anode current would occur due to the coincidence of the next two pulses 33 and 34 (with 34 being the reflected and inverted version of pulse 32). This last mentioned pulse of anode current would further excite the tuned circuit in proper phase to increase the amplitude of the output waves produced by tuned circuit 27, as would each subsequent anode pulse, until a maximum is reached. It will be seen that the circuit provides two different safeguards against accidental operation thereof by extraneous pulses interlarded between the pulses having the desired repetition frequency. One of the safeguards is that two sequential input pulses of 30 microseconds separation must be applied before any current will flow to the anode and shock excite the tuned circuit 27 into oscillation. The second safeguard is that one such coincidence alone will not produce a false signal because it will be necessary for the wave to be built up by repeated anode pulses to a predetermined amplitude before it will pass the threshold device. Consequently, the circuit provides extreme reliability against false operation.

It will be further noted amongst the advantages of this circuit that by using a reflecting delay line and a tap thereon, there is a substantial saving in the length of the line and furthermore the necessity for inverting any delayed pulse is avoided due to the normal inversion caused by the short circuited end of the reflecting line.

While we have described one specific embodiment of the present invention it will be obvious that changes may be made in the details thereof without departing from the teachings of the present invention. Accordingly, while we have described our invention above with reference to specific embodiments, it is to be understood that the invention is to be interpreted according to the state of the prior art and the appended claims.

We claim:

1. A pulse repetition rate selector for producing an output in response to pulses of a predetermined repetition frequency, comprising a multigrid electron tube having a first, second, and third grids, a cathode, and an anode, means for applying positive pulses to said first grid, each pulse producing a corresponding negative pulse on said second grid, an inverting reflecting delay line having a tap intermediate the ends thereof, the total delay time of said line from the input end thereof to the opposite end thereof and back to the tap being equal to one period of the said predetermined pulse repetition frequency, means coupling said second grid to the input of said delay line to thereby cause said negative pulses to traverse said line and be reflected, thereby being inverted and delayed therein, means for applying the said inverted pulses to said third grid to cause a pulse of current to flow to the anode when a positive pulse on the first grid coincides with said inverted pulse, and means responsive to the pulses of anode current for producing an output.

2. A pulse repetiton rate selector for producing an output in response to pulses of a predetermined repetition frequency, comprising a multigrid electron tube having a first, second, and third grids, a cathode, and an anode, means for applying positive pulses to said first grid, each pulse producing a corresponding negative pulse on said second grid, an inverting reflecting delay line having a tap intermediate the ends thereof, the total delay time of said line from the input end thereof to the other end thereof and back to the tap being equal to one period of the said predetermined pulse repetition frequency, means coupling said second grid to the input of said delay line to thereby cause said negative pulses to traverse said line and be reflected, thereby being inverted and delayed therein, means for applying the said inverted pulses to said third grid to cause a pulse of current to flow to the anode when a positive pulse on the first grid coincides with said inverted pulse, a means responsive to successive anode pulses of the same repetition frequency as said predetermined repetition frequency to produce a wave of increasing amplitude, and a threshold device adopted to produce an output when said wave exceeds a given amplitude.

3. A pulse repetition rate selector for producing an output in response to pulses of a predetermined repetition frequency, comprising a multigrid electron tube having a first, second, and third grids, a cathode, and an anode, means for applying positive pulses to said first grid, each pulse producing a corresponding negative pulse on said second grid, means coupled to said second grid for producing in response to each of said negative pulses, an inverted pulse delayed by a period equal to one period of said pulse repetition frequency, means for applying said inverted and delayed pulses to said third grid to cause a pulse of current to flow to the anode when a positive pulse on the first grid coincides with said inverted pulse, a resonant circuit in series with said anode tuned to a frequency equal to said pulse repetition frequency and adapted to be shock-excited by successive pulses of anode current into producing a voltage wave of increasing amplitude, and a threshold device connected to said resonant circuit adopted to produce an output when said wave exceeds a given amplitude.

4. A pulse repetition rate selector for producing an output in response to pulses of a predetermined repetition frequency, comprising a multigrid electron tube having a first, second, and third grids, a cathode, and an anode, means for biasing third grid to cut-off in the absence of pulses applied thereto, means for applying positive pulses to said first grid, each pulse producing a corresponding negative pulse on said second grid, an inverting reflecting delay line having a tap intermediate the ends thereof, the total delay time of said line from the input end thereof to the other end thereof and back to the tap being equal to one period of the said predetermined pulse repetition frequency, means coupling said second grid to the input of said delay line to thereby cause said negative pulses to traverse said line and be reflected, thereby being inverted and delayed therein, means for applying the said inverted pulses to said third grid to overcome its bias and cause a pulse of current to flow to the anode when a positive pulse on the first grid coincides with said inverted pulse, a resonant circuit in series with said anode tuned to a frequency equal to said pulse repetition frequency and adapted to be shock-excited by successive pulses of anode current into producing a voltage wave of increasing amplitude, and a threshold device connected to said resonant circuit adopted to produce an output only when said wave exceeds a given amplitude.

5. A pulse repetition rate selector for producing an output in response to pulses of a predetermined repetition frequency, comprising a multigrid electron tube having a first, second, and third grids, a cathode, and an anode, means for biasing said first and third grids to cut-off in the absence of pulses applied thereto, means for applying positive pulses to said first grid, each pulse producing a corresponding negative pulse on said second grid, an inverting reflecting delay line having a tap intermediate the ends thereof, the total delay time of said line from the input end thereof to the other end thereof and back to the tap being equal to one period of the said predetermined pulse repetition frequency, means coupling said second grid to the input of said delay line to thereby cause said negative pulses to traverse said line and be reflected, thereby being inverted and delayed therein, means for applying the said inverted pulses to said third grid to overcome its bias and cause a pulse of current to flow to the anode when a positive pulse on the first grid coincides with said inverted pulse, a resonant circuit in series with said anode tuned to a frequency equal to said pulse repetition frequency and adapted to be shock-excited by successive pulses of anode current into producing a voltage wave of increasing amplitude, and a threshold device connected to said resonant circuit adopted to produce an output only when said wave exceeds a given amplitude.

No references cited.